Patented Jan. 12, 1943

2,307,844

UNITED STATES PATENT OFFICE 2,307,844

INSECT LURE

Miyauooto McPhail, Honolulu, Territory of Hawaii, dedicated to the free use of the People in the territory of the United States No Drawing. Application April 15, 1941, Serial No. 388,649

3 Claims. (Cl. 167—48)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the people in the territory of the United States to take effect on the granting of a patent to me.

This invention relates to insect lures, and the general object is the provision of a chemical for luring and holding in captivity insects of the melonfly (Dacus cucurbitae) variety.

I have found that linseed oil soap has an unusually high degree of luring ability for these insects, and in this respect is unique in its action. Not only does linseed oil soap have an unusual luring ability, but its surface tension is low enough to drown the insects when they come in contact with it. I have also found that linseed oil soap attracts both sexes of insects equally, unlike some lures which are favored principally by either the male or female.

In comparison experiments, linseed oil soap was tested against a standard lure and was found to be 5.49 times as effective; that is, the linseed oil soap attracted and captured 5.49 flies for every one attracted to, and captured by, the standard lure.

I have also found corn oil soap to be an effective lure for the insects mentioned, but somewhat less effective than linseed oil soap. A comparison test showed that, under identical circumstances, corn oil soap captured 526 insects, when linseed oil soap captured 2,082—approximately ¼ as effective, but still more effective than the standard lure.

As a lure the linseed oil soap or corn oil soap may be used either alone or as an ingredient in a mixture. For example, I have found a mixture of orchid blossom oil in linseed oil soap to be a satisfactory lure mixture where it is desired to capture a larger percentage of male insects, the orchid blossom oil being predominately a lure for male insects.

Having thus described my invention, I claim:

1. A lure for the melonfly (Dacus cucurbitae) comprising as its essential active ingredient a soap chosen from the group consisting of linseed oil soap and corn oil soap.

2. A lure for the melonfly (Dacus cucurbitae) comprising as its essential active ingredient linseed oil soap.

3. A lure for the melonfly (Dacus cucurbitae) comprising as its essential active ingredient corn oil soap.

MIYAUOOTO McPHAIL.